J. A. KNEEDLER.
Sulky-Plows.

No. 157,842.  Patented Dec. 15, 1874.

WITNESSES:
C. Neveux
A. F. Terry

INVENTOR:
John A. Kneedler
BY
[signature]
ATTORNEYS.

UNITED STATES PATENT OFFICE.

JOHN A. KNEEDLER, OF GRANT, PENNSYLVANIA.

IMPROVEMENT IN SULKY-PLOWS.

Specification forming part of Letters Patent No. 157,842, dated December 15, 1874; application filed October 3, 1874.

*To all whom it may concern:*

Figure 1:
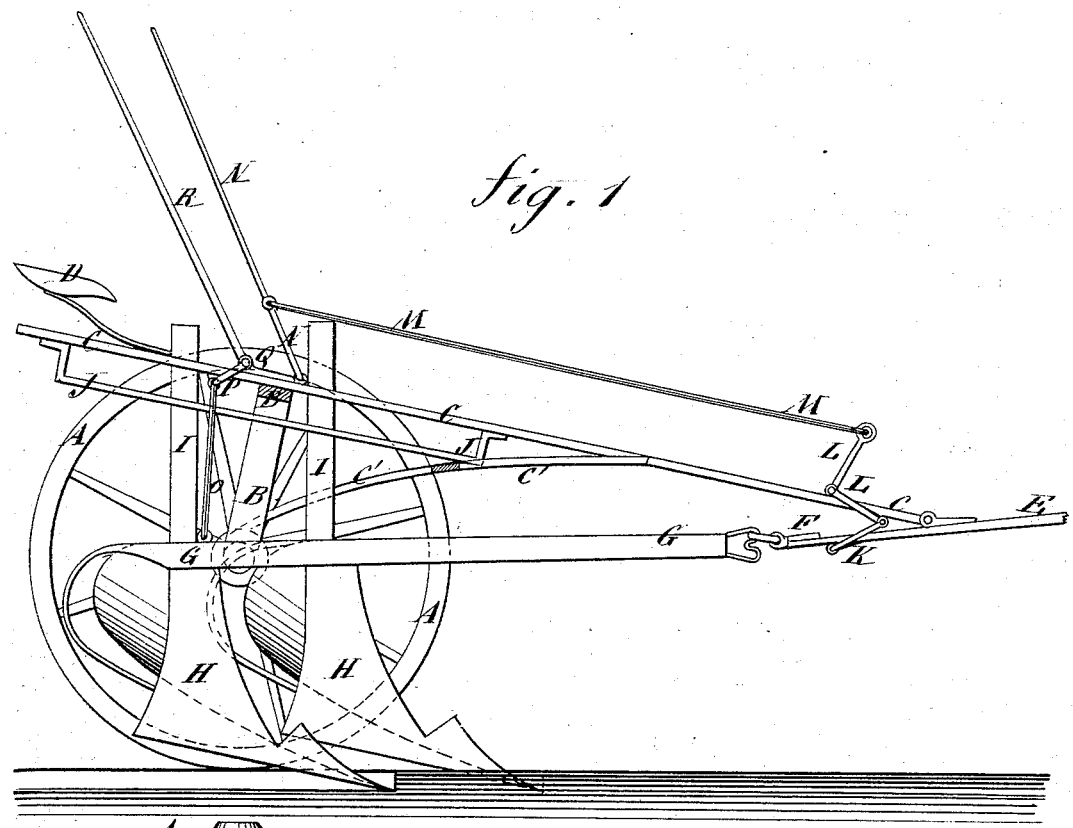
Figure 2:
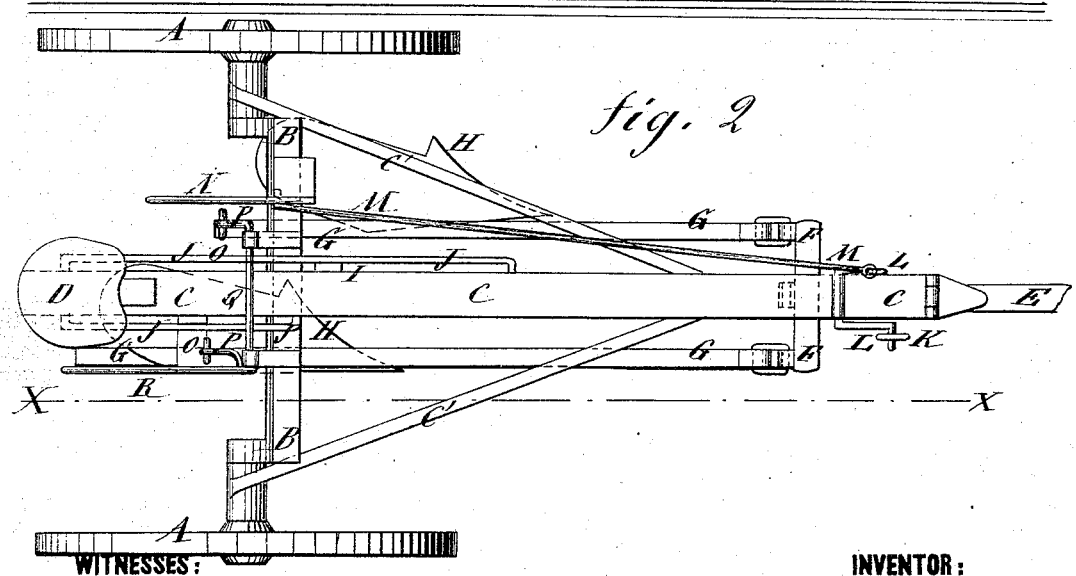

Be it known that I, JOHN A. KNEEDLER, of Grant, in the county of Indiana and State of Pennsylvania, have invented a new and useful Improvement in Sulky-Plows, of which the following is a specification:

Figure 1 is a vertical longitudinal section of my improved sulky-plow, taken through the line $x\ x$, Fig. 2. Fig. 2 is a top view of the same.

Similar letters of reference indicate corresponding parts.

The invention will first be fully described, and then pointed out in the claim.

A A are the wheels, which revolve upon the journals of the axle B. The axle B is bent four times at right angles to form space beneath its middle part for the plows. To the center of the axle B is attached a bar, C, the rear end of which projects a little in the rear of said axle B, and has the driver's seat D attached to it, so that the driver's weight may tend to balance the downward pressure upon the horses' necks. The bar C is strengthened by braces $c'$, the forward ends of which are secured to the forward part of the said bar C, and their rear ends are secured to the end horizontal parts of the axle B. To the forward end of the bar C is hinged the tongue E, at a little distance from its rear end. To the rear end of the tongue E is attached a cross-bar, F, to the ends of which are attached eyes to receive links or other connections for connecting the plow-beams or plow-beam clevises with the said cross-bar F. G are the plow-beams, to the forward ends of which, or to clevises attached to said ends, the draft is applied. To the rear ends of the beams G are attached the plows H, in the ordinary manner. To the rear part of the plow-beams G are rigidly attached the lower ends of the uprights I, which pass up through guides J, attached to the sides of the bar C, and which pass along above and below the axle B. The uprights I and guides J keep the plows in an upright position, and at the proper distance apart, while allowing them to move up and down freely. When only one plow is to be used, the forward end of its beam is connected with an eye attached to the center of the cross-bar F. To the rear part of the tongue E, at or near the cross-bar F, is pivoted a crank, K, to the end of one of the arms of the double crank L. The double crank L is pivoted to the forward part of the bar C near its forward or hinged end, and to the end of its other crank-arm is pivoted the forward end of the connecting-rod M, the rear end of which is pivoted to the lever N. The lower end of the lever N is pivoted to the axle B, and its upper end projects into such a position that it may be conveniently reached and operated by the driver from his seat D.

By this construction, by operating the lever N, the driver can lower and raise the forward ends of the plow-beams G, to cause the plows to work deeper or shallower in the ground, or to cause them to run out of the ground. To the rear ends of the plow-beams G are pivoted the lower ends of the rods O, the upper ends of which are pivoted to the crank-arms P, formed upon or attached to the shaft Q, which works in bearings attached to the axle B. To the shaft Q is also rigidly attached a lever, R, which projects into such a position that it can be conveniently reached and operated by the driver from his seat.

By this construction, by operating the lever R, in connection with the lever N, the plows may be raised from the ground, and held suspended while turning, and while passing from place to place.

Having thus described my invention, what I claim as new, and desire to secure by Letters Patent, is—

The combination of crank K, double crank L, connecting-rod M, and lever N with hinged tongue E, rigid bar C, and axle B, as and for the purpose described.

JOHN A. KNEEDLER.

Witnesses:
E. BRALLIER,
L. A. HOLLISTER.